June 14, 1938.  D. B. WEBSTER  2,120,925
WHEEL BALANCING FIXTURE
Filed Jan. 27, 1936  2 Sheets-Sheet 2
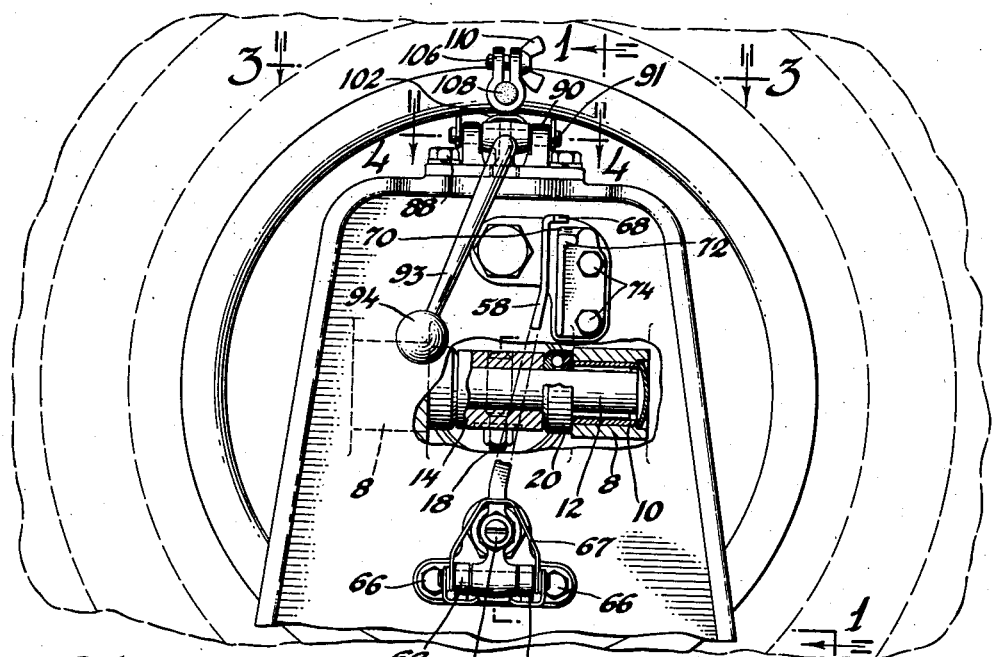
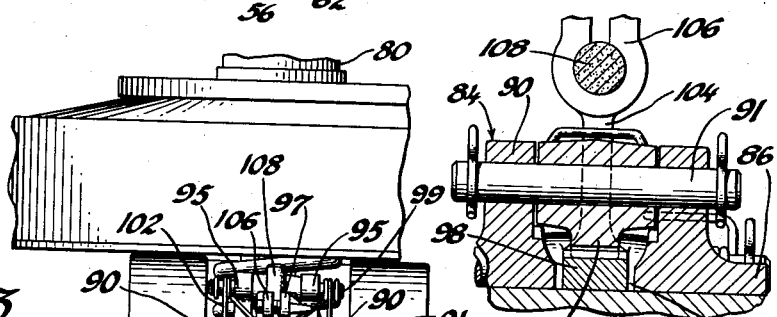
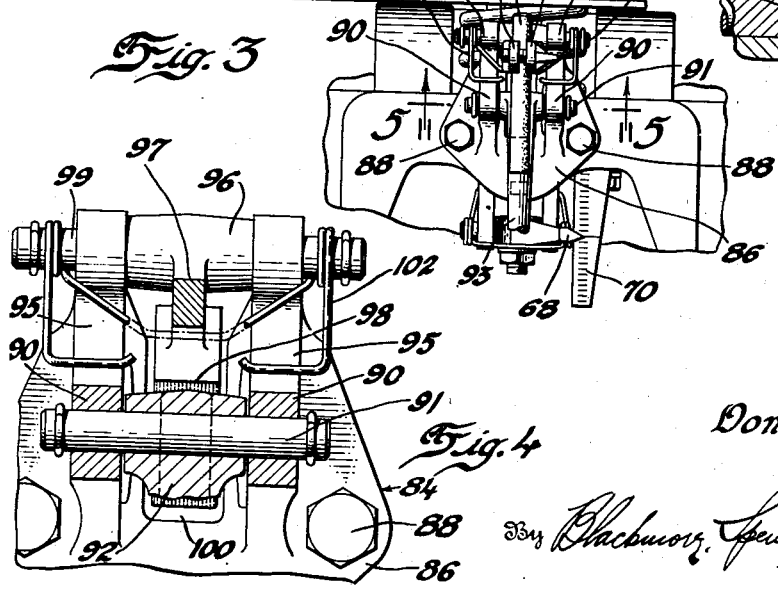
Inventor
Don B. Webster Patented June 14, 1938

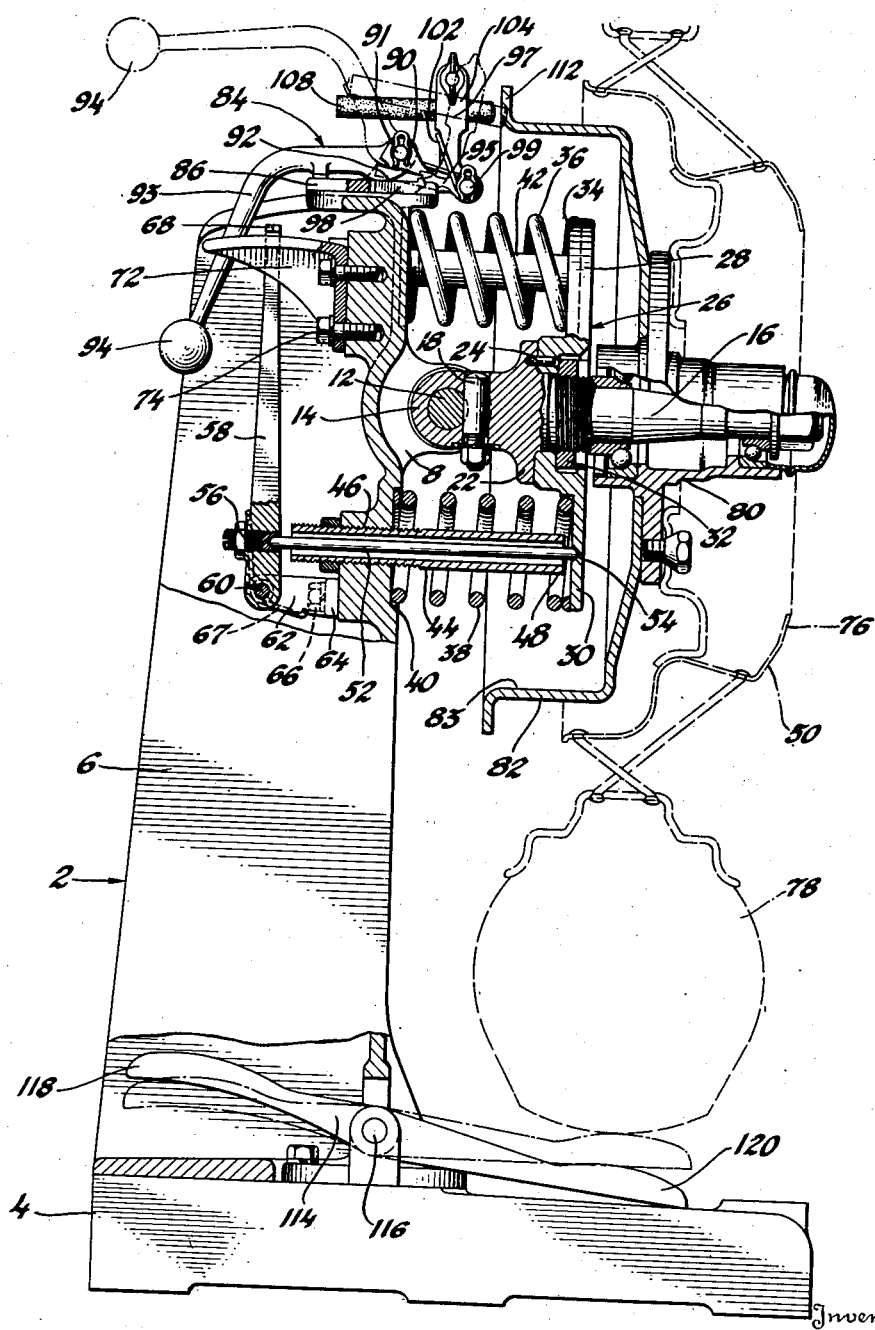

2,120,925

UNITED STATES PATENT OFFICE 2,120,925

WHEEL BALANCING FIXTURE

Don B. Webster, Royal Oak, Mich., assignor to General Motors Corporation, Detroit, Mich., a corporation of Delaware Application January 27, 1936, Serial No. 60,913

15 Claims. (Cl. 73—51)

This invention relates to a machine for the balancing of wheels or wheel assemblies used on automotive vehicles.

Before the wheels are installed on an automobile, experience has taught that there is a small amount of dynamic unbalance to the wheel; that is, due to a lack of perfect uniformity in the thickness of the metal and of the tire, there are unequal distributions of weight which make the wheel heavier at some parts than at the others, and in order to obtain better and smoother operation of the vehicle it is desirable to have all of the wheels in static and dynamic balance before they are applied to the vehicle.

It is the object of the present invention to design a machine which will show whether the wheel is out of balance and at what point the out-of-balance is located so that proper correction can be made to obtain the desired dynamic balance. The wheels are placed in static balance before their dynamic unbalance is determined.

The machine of the invention comprises an upright having a pair of ears between which a wheel spindle is pivoted on a horizontal axis. The hub of the spindle has two oppositely projecting arms extending above and below, and between the arms and the frame of the machine there are positioned identical coil springs. A bar contacting at one end with one of the arms and at the other end with a pointer causes the pointer to move over a scale when the spindle oscillates. The frame of the machine has secured thereto a fixture which holds a marker in the form of a piece of chalk which is projected into the path of movement of a part of the wheel assembly to place thereon a suitable mark to indicate the oscillations of the wheel.

On the drawings

Figure 1 is a side view with parts in section showing the machine of the invention with the wheel assembly mounted thereon, the wheel being shown partly in dotted outline.

Figure 2 is a detail view of the top of the machine looking from the rear, with parts broken away and shown in section.

Figure 3 is a plan view of the machine on the line 3—3 of Figure 2.

Figure 4 is an enlarged sectional detail view on the line 4—4 of Figure 2.

Figure 5 is an enlarged sectional detail view taken substantially on the line 5—5 of Figure 3.

Referring to the drawings, the numeral 2 indicates the machine as a whole. The machine has the base 4 and the upright or frame 6. The frame has the spaced ears 8 provided with the bearings 10. In the bearings there is rotatably mounted the shaft 12 and on the shaft there is mounted the eye 14 of the spindle 16. The spindle 16 is secured to the shaft 14 by means of the pin 18. Suitable ball thrust bearings 20 are positioned between the sides of the eye 14 and the ears 8.

The spindle 16 has the shoulder 22 on which there is positioned, by means of the pin 24, a plate 26 having an upper arm 28 and a lower arm 30. The plate 26 has a central opening through which the spindle 16 passes. A ring 32 is screw threaded on the spindle 16 and holds the plate 26 in place. Each arm 28 and 30 has an edge rib or flange 34 to form a seat for the upper and lower coil springs 36 and 38. These two springs are duplicates of each other and in all respects identical as to weight and tension. The other ends of the springs 36 and 38 abut against the frame member 6 and are received in pockets 40 best shown in Figure 1. The coil springs 36 and 38 surround tubes 42 and 44, the tubes being screw threaded as at 46 into suitable openings provided in the upright 6. The ends 48 of the tubes do not extend to the plate 26 but somewhat short thereof as shown in Figure 1 to allow the plate 26 to oscillate to indicate the unbalance of the wheel or wheel assembly which is indicated as a whole at 50.

The lower tube 44 extends into the hollow part of the frame 6 and houses a rod 52, one end of which is received in a piloting recess 54 in the lower arm 30 while the other end is received in a pilot 56 screw threaded into the pointer arm 58 which is pivoted at 60 between the ears 62 of the bracket 64, secured by means of the bolts 66 to the frame 6. A spring 67 constantly urges the pointer toward the frame 6. The index 68 of the pointer moves over a scale 70 provided on a bracket 72 secured to the frame by means of the bolts 74.

The wheel assembly 50 includes the wheel 76, the tire 78, the hub 80, and the brake drum 82. These parts are mounted on the spindle 16 in the usual manner in which a wheel is mounted on the spindle of an automotive vehicle. By rotating the wheel and giving to it a definite number of revolutions per minute it will be found that if the wheel is out of dynamic balance it will begin to oscillate or wabble somewhat to cause the oscillation of the plate 26 against the tension of one of the springs aided by the expansion of the other. This oscillation of the plate 26 will be transmitted by the rod 52 to the pointer 58 to cause the index 68 to move over the scale 70 and the degree of oscillation of the index 68 will show that the wheel is out of balance and to what extent. If there is no oscillation of the index the wheel is in balance.

To rotate the wheel a small electric motor (not shown) is used and this motor is preferably attached to the plate 26 and its power is suitably transmitted to the inner periphery 83 of the brake drum. The rate of rotation of the wheel is increased until it reaches its critical speed, or the speed at which it oscillates the most or has its maximum amplitude. The actual number of revolutions a minute which constitutes the critical speed will depend on the tension and other characteristics of the springs 36 and 38 and the moment of inertia of the moving parts (wheel, drum, spindle, etc.) about the axis of movement of the spindle. Where the critical speed is, say, 440 R. P. M. the rotation of the wheel is increased a little, say, 10 R. P. M., over this critical speed, or to 450 R. P. M., and the rotation continued until the index 68 has a substantially constant amplitude of vibration over the scale 70. This will indicate the amount or degree of unbalance, for the reason that the amplitude of vibration of the index is practically proportional to the amount of unbalance for that particular speed.

In order to indicate the place at which the unbalance is located use is made of the fixture indicated as a whole at 84 which is applied at any suitable part of the machine. Preferably it is applied to the top of the upright 6. The fixture comprises the base 86 fastened by means of suitable bolts 88 to the top of the frame. Projecting upwardly from the base are the two ears 90 provided with suitable openings to receive the shaft 91. On the shaft 91 there is pivoted the cam 92 having the operating handle 93 with a weight 94 at the end thereof. The ears 90 have forward extensions 95 between which there is pivoted on the shaft 99 the elbow 96 of a bell crank lever 97. The lower arm 98 of the bell crank lever is received in the slot 100 provided in the base 86 and when the handle 93 is in the down position as shown in full lines in Figure 1, the cam 92 will hold the lever 98 in the slot. When the handle 93 is moved from the full line to the dotted line position the cam will release the lower arm 98 and allow the spring 102 to swing the lower arm upward and the upper arm 104 from the full to the dotted line position in Figure 1. The upper arm 104 has its end forked as shown at 106 in Figure 5, the two forks providing an opening in which to receive a marker 108 which in the present instance is a stick of chalk. A thumb screw 110 is used to pinch the forks 106 together tightly to hold the marker between the forks.

When the parts of the fixture 84 are in the full line position shown in Figure 1, the chalk or marker 108 will not contact with any portion of the wheel. When the handle 93 is moved to the dotted line position to allow the cam 92 to release the bell crank lever 97, the chalk is adapted to contact with the flange 112 on the brake drum 82. After the wheel assembly 50 is rotated and the index 68 indicates a substantially constant wabble of the wheel, as previously described, the lever 93 is slowly moved to the dotted line position until the marker contacts the rim. If the wheel is not oscillating or is in dynamic balance the chalk will make a complete circle of uniform thickness on the flange 112 of the drum. If the wheel is oscillating and there is some unbalance the marker will make an arc only on the flange 112 and on that part which is oscillated the farthest toward the marker when the wheel is rotating.

From the length of the marked arc it can be determined at what place the wheel assembly is out of balance. This is done by drawing radii from the ends of the arc and bisecting the angle. Experience has taught that the unbalanced part of the wheel is always in a plane passing through the spindle and forming a definite angle with the bisector. By now taking into consideration the amplitude of the index 68 the proper amount of weight can be applied to place the wheel in dynamic balance.

At the base of the fixture 2 a foot brake or treadle 114 is pivoted at 116. By pressing on the pedal end 118 the operator will cause the brake end 120 to contact with the tire to stop the wheel. The installation of the lever 114 is optional.

I claim:

1. In a wheel balancing machine, an upright frame, a pivoted wheel spindle mounted thereon and adapted to receive a wheel assembly, said spindle being axially nonrotatable; a plurality of arms on said spindle, springs mounted between the arms and the frame, said arms and springs being adjacent the pivot of the spindle, a rod contacting with one of the arms, a pointer contacting with the rod and adapted to be moved thereby to indicate the mount of unbalance of the wheel.

2. In a wheel balancing machine, an upright frame, an oscillatable wheel spindle pivotally mounted thereon and adapted to receive a wheel assembly, said spindle being axially nonrotatable, a plurality of arms on said spindle, springs mounted between the arms and the frame, said springs and arms being adjacent the pivot of the spindle, a marker mounted on the frame, and means to move the marker into and out of engagement with the wheel assembly, said marker forming on the wheel an arcuate mark from which the place of unbalance is determined.

3. In a wheel balancing machine, an upright frame, an oscillatable wheel spindle pivotally mounted thereon and adapted to receive a wheel assembly, said spindle being axially nonrotatable, a plurality of arms on said spindle, springs mounted between the arms and the frame, said springs and arms being adjacent the pivot of the spindle, a marker mounted on the frame, means to move the marker into and out of engagement with the wheel assembly, said marker indicating on the wheel assembly the place of unbalance, and a pointer operated from the wheel spindle to indicate the amount of unbalance.

4. In a wheel balancing machine, a frame, means on the frame rotatably to mount a wheel, a fixture positioned on the frame adapted to mark an arc on the wheel to indicate the place of unbalance, said fixture comprising a base secured to the frame, a cam pivoted to the base, a bell crank lever pivoted to the base, said base having a slot to receive one arm of the lever, said cam retaining the arm in the slot, a marker on the other arm, means to move the lever arm when the cam is released, said marker making a mark on the wheel when the cam releases the lever.

5. In a fixture for making a mark on a wheel to indicate the place of unbalance, a base mounted on a wheel balancing machine, a shaft mounted on the base, a cam element journaled on a shaft, a bell crank lever pivotally mounted on the base, one arm of said lever being controlled by the cam, a marker member mounted on the second arm of the lever, and a spring to cause the movement of the bell crank lever to make a mark on the wheel when the cam member is released.

6. In a wheel balancing machine, a base, a spindle pivoted to the base and extending in a horizontal plane, arms on the spindle, a coil spring between each arm and the base, a tube extending through one coil spring and into the base, a rod passing through said tube and contacting at one end with one arm of the spindle, a pointer pivoted to the base, the other end of said rod contacting with the pointer and adapted to move the pointer in response to vibrations of the wheel, said pointer moving over a dial to indicate the amount of unbalance.

7. In a wheel balancing machine, an upright frame, a stationary shaft mounted on the frame, a short oscillatable and axially nonrotatable wheel spindle pivotally mounted on the shaft and projecting laterally away from the frame and adapted to receive a wheel assembly, said wheel assembly being rotatable on said spindle, a plurality of arms on said spindle, and springs mounted between the arms and the frame.

8. In a wheel balancing machine, an upright frame, a stationary shaft mounted on the frame, a short oscillatable and axially nonrotatable wheel spindle pivotally mounted on the shaft and projecting laterally away from the frame and adapted to receive a wheel assembly, said wheel assembly being rotatable on said spindle, a plurality of arms on said spindle, springs mounted between the arms and the frame, and a pointer operated from one of the arms and independently of the springs to indicate the amount of unbalance.

9. In a wheel balancing machine, an upright frame, a stationary shaft mounted on the frame, a short oscillatable and axially nonrotatable spindle pivotally mounted on the shaft and projecting laterally away from the frame and adapted to receive a wheel assembly, said wheel assembly being rotatable on said spindle, a plurality of arms on said spindle, springs mounted between the arms and the frame, and a marker on the frame to make a definite mark on the wheel to determine the place of unbalance.

10. In a wheel balancing machine, a frame, a stationary shaft mounted on the frame, a short oscillatable and axially nonrotatable wheel spindle pivotally mounted on the shaft and projecting laterally away from the frame and adapted to receive a wheel assembly, said wheel assembly being rotatable on said spindle, a plurality of arms on the spindle, springs mounted between the arms and the frame, means operated from the oscillatable spindle to indicate the amplitude of oscillation, the speed of rotation of said wheel assembly at the time the unbalance is determined differing from the critical speed.

11. In a wheel balancing machine, an upright frame, a stationary shaft mounted on the frame, a wheel spindle pivotally mounted on the shaft and adapted rotatably to receive a wheel assembly, said spindle being axially nonrotatable, a plurality of arms on the spindle projecting away from the spindle at substantially right angles to the axis thereof, and springs directly interposed between the arms and the frame.

12. In a wheel balancing machine, an upright frame, a stationary shaft mounted on the frame, a wheel spindle pivotally mounted on the shaft and adapted rotatably to receive a wheel assembly, said spindle being axially nonrotatable, a plurality of arms on the spindle projecting away from the spindle at substantially right angles to the axis thereof, spring seats on the frame and on the arms, and springs seated in the seats and interposed between the arms and the frame.

13. In a wheel balancing machine, an upright frame, a stationary shaft mounted on the frame, a wheel spindle pivotally mounted on the shaft and adapted rotatably to receive a wheel assembly, said spindle being axially nonrotatable, a plurality of arms on the spindle projecting away from the spindle at substantially right angles to the axis thereof, a spring seat on the end of each arm, corresponding spring seats on the frame, and a spring between the end of each arm and the base, said springs positioned in said seats.

14. In a wheel balancing machine, an upright frame, an oscillatable horizontally positioned wheel spindle mounted thereon on a horizontal pivot and adapted to receive a wheel assembly, said spindle being axially nonrotatable and projecting laterally away from said frame, a plurality of arms on said spindle, springs mounted between the arms and the frame, said arms and springs being adjacent the pivot of the spindle, a marker mounted on the frame, and means to move the marker into and out of engagement with the wheel assembly, said marker indicating on the wheel assembly by a definite mark the place of unbalance.

15. In a wheel balancing machine, an upright frame, an oscillatable horizontally positioned wheel spindle mounted thereon on a horizontal pivot and adapted to receive a wheel assembly, said spindle being axially nonrotatable and projecting laterally away from said frame, a plurality of arms on said spindle, springs mounted between the arms and the frame, said arms having springs being adjacent the pivot of the spindle, a marker mounted on the frame, means to move the marker into and out of engagement with the wheel assembly, said marker indicating on the wheel assembly by a definite mark the place of unbalance, and a pointer operated from one of the arms to indicate the amount of unbalance.

DON B. WEBSTER.

CERTIFICATE OF CORRECTION.

Patent No. 2,120,925. June 14, 1938.

DON B. WEBSTER.

It is hereby certified that error appears in the printed specification of the above numbered patent requiring correction as follows: Page 2, second column, line 30, claim 1, for the word "mount" read amount; page 3, first column, line 51, claim 10, after "wheel" strike out the comma; and that the said Letters Patent should be read with this correction therein that the same may conform to the record of the case in the Patent Office.

Signed and sealed this 9th day of August, A. D. 1938.

Leslie Frazer (Seal)  Acting Commissioner of Patents.